United States Patent
Chao

(10) Patent No.: US 11,051,372 B2
(45) Date of Patent: Jun. 29, 2021

(54) WIRELESS LAMP-DRIVING DEVICE WITH INDEPENDENT POWER SOURCE AND LAMP SYSTEM INCLUDING THE SAME

(71) Applicant: Chin-Wei Chao, Taipei (TW)

(72) Inventor: Chin-Wei Chao, Taipei (TW)

(*) Notice: Subject to any disclaimer, the term of this patent is extended or adjusted under 35 U.S.C. 154(b) by 12 days.

(21) Appl. No.: 16/474,910

(22) PCT Filed: Nov. 21, 2017

(86) PCT No.: PCT/CN2017/112106
§ 371 (c)(1),
(2) Date: Jun. 28, 2019

(87) PCT Pub. No.: WO2018/126807
PCT Pub. Date: Jul. 12, 2018

(65) Prior Publication Data
US 2020/0128655 A1    Apr. 23, 2020

(30) Foreign Application Priority Data

Jan. 4, 2017 (CN) .......... 201710004414.5
Aug. 18, 2017 (CN) .......... 201710711227.0

(51) Int. Cl.
*H05B 47/19* (2020.01)
*H05B 45/12* (2020.01)
(Continued)

(52) U.S. Cl.
CPC .......... *H05B 45/12* (2020.01); *H05B 45/40* (2020.01); *H05B 47/19* (2020.01); *H05B 47/11* (2020.01)

(58) Field of Classification Search
CPC ........ H05B 47/11; H05B 47/14; H05B 47/17; H05B 47/175; H05B 47/19; H05B 47/195
See application file for complete search history.

(56) References Cited

U.S. PATENT DOCUMENTS 6,120,262 A      9/2000  McDonough et al.
9,801,250 B1 * 10/2017  Halliwell .................. F21K 9/65
(Continued)

FOREIGN PATENT DOCUMENTS

CN    102625529 A    8/2012
CN    203618190 U    5/2014
(Continued)

OTHER PUBLICATIONS

Translation of International Search Report cited in International Appln. No. PCT/CN2017/112106 dated Jan. 22, 2018.

*Primary Examiner* — Tung X Le
(74) *Attorney, Agent, or Firm* — Bacon & Thomas, PLLC

(57) ABSTRACT

A wireless lamp-driving device with an independent power source and a lamp system including the same are provided. The lamp system is composed at least of a light-emitting diode (LED) lamp, a stationary switching device, and a wireless controller, wherein the wireless lamp-driving device, the stationary switching device and the wireless controller have their respective power sources, the wireless lamp-driving device is connected to the stationary switching device and the wireless controller separately in a wireless manner, and is configured to receive wireless signals from the stationary switching device and the wireless controller in order to control the light emission states of the LED lamp according to the contents of each wireless signal received.

18 Claims, 2 Drawing Sheets

(51) Int. Cl.
    *H05B 45/40*     (2020.01)
    *H05B 47/11*     (2020.01)

(56) References Cited

U.S. PATENT DOCUMENTS

| | | |
|---|---|---|
| 2010/0207759 A1 | 8/2010 | Sloan et al. |
| 2010/0244709 A1* | 9/2010 | Steiner .................. H05B 47/10 315/158 |
| 2011/0032070 A1 | 2/2011 | Bleile |
| 2011/0063510 A1* | 3/2011 | Lee .................... G02F 1/133605 348/563 |
| 2011/0285526 A1 | 11/2011 | Tanaka et al. |
| 2012/0091915 A1* | 4/2012 | Ilyes et al. ........... H05B 47/185 315/307 |
| 2013/0214609 A1* | 8/2013 | Carmen, Jr. ........... H02J 7/025 307/104 |
| 2014/0265880 A1* | 9/2014 | Taipale .................. H05B 45/10 315/158 |
| 2015/0195883 A1* | 7/2015 | Harris .................. H05B 47/105 315/155 |
| 2017/0171948 A1 | 6/2017 | Jacobson |

FOREIGN PATENT DOCUMENTS

| | | |
|---|---|---|
| CN | 201108693 U | 6/2015 |
| CN | 104902649 A | 9/2015 |
| CN | 205124048 U | 3/2016 |
| CN | 105657926 A | 6/2016 |
| EP | 3515155 A1 | 8/2017 |
| JP | 2007059352 A | 3/2007 |
| JP | 2011070858 A | 4/2011 |
| JP | 2014022197 A | 2/2014 |
| JP | 2015173135 A | 10/2015 |
| JP | 2015179562 A | 10/2015 |
| TW | 201034514 A | 9/2010 |
| TW | M460480 U | 8/2013 |

* cited by examiner

WIRELESS LAMP-DRIVING DEVICE WITH INDEPENDENT POWER SOURCE AND LAMP SYSTEM INCLUDING THE SAME

FIELD OF THE INVENTION

The present invention relates to a lamp system and more particularly to one in which the wireless lamp-driving device, the stationary switching device, and the wireless controller have their respective power sources and in which, therefore, the wireless lamp-driving device remains operative (e.g., can turn on and off a light-emitting diode lamp in response to wireless signals transmitted from the wireless controller) when the stationary switching device is in the "power-off mode" (i.e., the mode in which the stationary switching device is designed to have turned off the lamp).

BACKGROUND OF THE INVENTION

Recently, more and more electronic devices are wirelessly controllable thanks to technological advancements and the rapid development of wireless transmission technologies. Such designs, without doubt, reduce the difficulties of interior wiring considerably and are hence popular among the general public.

Generally, a conventional lamp system includes a lamp (e.g., an LED (light-emitting diode) lamp), a lamp driving device, a stationary switching device, and a wireless controller. The lamp driving device is electrically connected to the lamp in order to bring the lamp into an on state or an off state. The stationary switching device is typically fixed on a wall and is configured to receive electricity from an external source (e.g., mains electricity). The stationary switching device and the lamp driving device are connected by physical wires so that the stationary switching device can transmit electricity to the lamp driving device and the lamp. A user, therefore, can operate the stationary switching device (e.g., by pressing the on/off press-key) in order for the stationary switching device to transmit or not to transmit electricity to the lamp driving device, thereby adjusting the lamp to the on or off state.

The wireless controller can be used to send a wireless control signal to the lamp driving device, generally by an infrared transmission method, and once receiving the wireless control signal, the lamp driving device adjusts the lamp to the on or off state according to the contents of the wireless control signal. This allows the user to turn on and off the lamp remotely via the remote controller, without having to walk to the stationary switching device. In other words, the wireless controller adds to the convenience of lamp operation.

After using the foregoing lamp system in person, however, the inventor of the present invention found that there is still room for improvement, as explained below. First, the stationary switching device switches on or off the lamp typically by "allowing or cutting off the supply of electricity"; that is to say, power supply from an external power source is allowed in order to turn on the lamp and is cut off to turn off the lamp. However, when a user turns off the lamp through the stationary switching device (i.e., when the user switches the stationary switching device to the "power-off mode"), the external power source is cut off from not only the lamp, but also the lamp switching device. As a result, the lamp switching device is out of power and therefore inoperative, meaning the user is now unable to turn on the lamp through the wireless controller. To restore wireless control, the user has to walk to and switch on the stationary switching device, for only when the stationary switching device receives electricity from the external power source and transmits electricity to the lamp driving device will the lamp driving device become operative again, allowing the user to control the lamp via the wireless controller. Undoubtedly, the aforesaid design compromises the convenience the wireless controller is intended to bring about, making it impossible for the user to operate the lamp wherever and whenever desired. Second, the short effective transmission distance, directional limitation, and lack of penetrability of infrared signals require that one who tries to turn on or off the lamp through the wireless controller be close to the lamp and direct the wireless controller toward the lamp driving device, and these requirements add to the inconvenience of use.

According to the above, the existing lamp systems are generally disadvantaged by the fact that their wireless controller will be rendered inoperative (i.e., the intended advantage of "wireless control" will be temporarily lost) once the stationary switching device enters the "power-off-mode (or lamp-turned-off mode)". The issue to be addressed by the present invention is to overcome the aforesaid drawbacks and provide better user experience.

BRIEF SUMMARY OF THE INVENTION

In view of the fact that a conventional LED lamp needs to receive electricity from a stationary switching device and that, therefore, as long as the stationary switching device is switched to the "power-off mode (or lamp-turned-off mode)" the LED lamp is out of power and renders its wireless controller futile and hence incapable of providing the convenience of remote control, the inventor of the present invention incorporated years of practical experience into a detailed research, extensive survey, and repeated tests and finally succeeded in developing a wireless lamp-driving device with an independent power source and a lamp system including the same, the goal being to provide the general public with a lamp system that is more convenient to use than its prior art counterparts.

One objective of the present invention is to provide a lamp system that includes a wireless lamp-driving device with an independent power source. The lamp system is composed at least of an LED lamp, a stationary switching device, and a wireless controller, in addition to the wireless lamp-driving device. The wireless lamp-driving device is configured to receive first external electricity continuously and is electrically connected to the LED lamp. The stationary switching device is configured to receive second external electricity continuously. The wireless controller is configured to receive electricity from a battery unit provided therein. Thus, the wireless lamp-driving device, the stationary switching device, and the wireless controller have their respective power sources. The wireless lamp-driving device is connected to the stationary switching device and the wireless controller separately in a wireless manner and is configured to receive wireless signals from the stationary switching device and the wireless controller separately, in order to control the light emission state of the LED lamp according to the contents of each wireless signal received. When the stationary switching device is in a "power-off mode (or lamp-turned-off mode)", the wireless controller is still capable of turning on or off the LED lamp through the wireless lamp-driving device.

Another objective of the present invention is to provide a wireless lamp-driving device that has an independent power source and can be used in a lamp system. The wireless lamp-driving device is configured to receive external electricity and is electrically connected to an LED lamp in order to control the light emission state of the LED lamp. The wireless lamp-driving device includes a first power supply unit, a power switching portion, a wireless receiving unit, and a control unit. The first power supply unit is configured to receive external electricity continuously and to provide the electricity required for operation of the wireless lamp-driving device. The power switching portion is separately and electrically connected to the first power supply unit and the LED lamp and has a power supply mode, in which the power switching portion provides electricity from the first power supply unit to the LED lamp, and a power-off mode, in which the power switching portion no longer provides electricity to the LED lamp. The wireless receiving unit is electrically connected to the first power supply unit and is configured to receive a wireless signal from a stationary switching device or a wireless controller. The control unit is separately and electrically connected to the first power supply unit, the power switching portion, and the wireless receiving unit and is configured to receive and read the wireless signal transmitted from the wireless receiving unit and to adjust the power switching portion to the power supply mode or the power-off mode according to the contents of the wireless signal received, thereby changing the light emission state of the LED lamp. As the wireless lamp-driving device receives external electricity independently and continuously and is configured to receive a wireless signal from an external device (e.g., the stationary switching device or the wireless controller) through wireless transmission, switching the stationary switching device to the "power-off mode (or lamp-turned-off mode)" will not interrupt normal operation of the wireless lamp-driving device.

BRIEF DESCRIPTION OF THE SEVERAL VIEWS OF THE DRAWINGS

The objectives, technical features, and effects of the present invention can be better understood by referring to the following detailed description of some illustrative embodiments in conjunction with the accompanying drawings, in which.

DETAILED DESCRIPTION OF THE INVENTION

The present invention is detailed below by way of certain embodiments and the accompanying drawings so that the objectives, technical solution, and advantages of the invention can be clearly understood.

Figure 1:
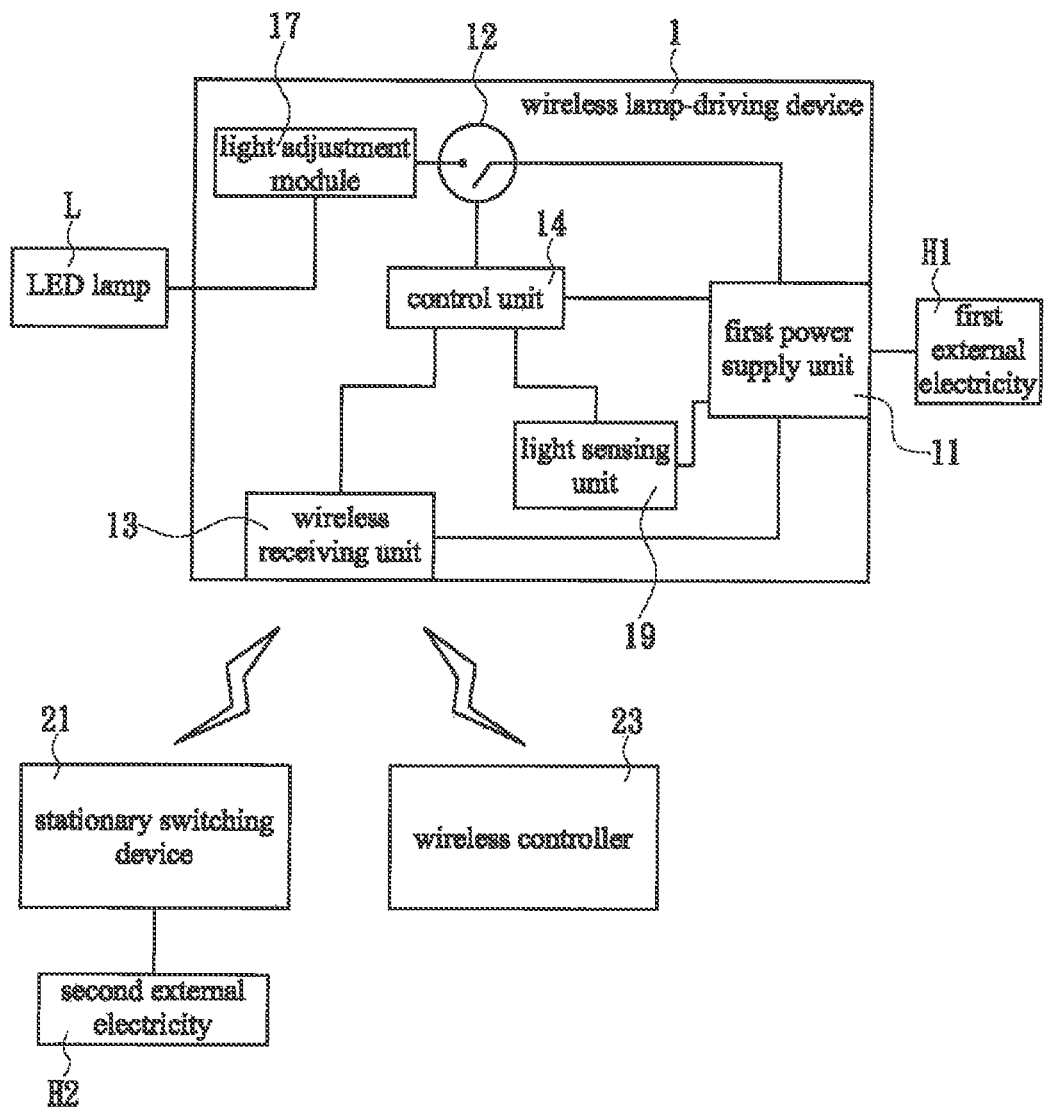
FIG. 1 is a hardware block diagram of a lamp system according to the present invention, showing in particular the wireless lamp-driving device 1.
Figure 2:
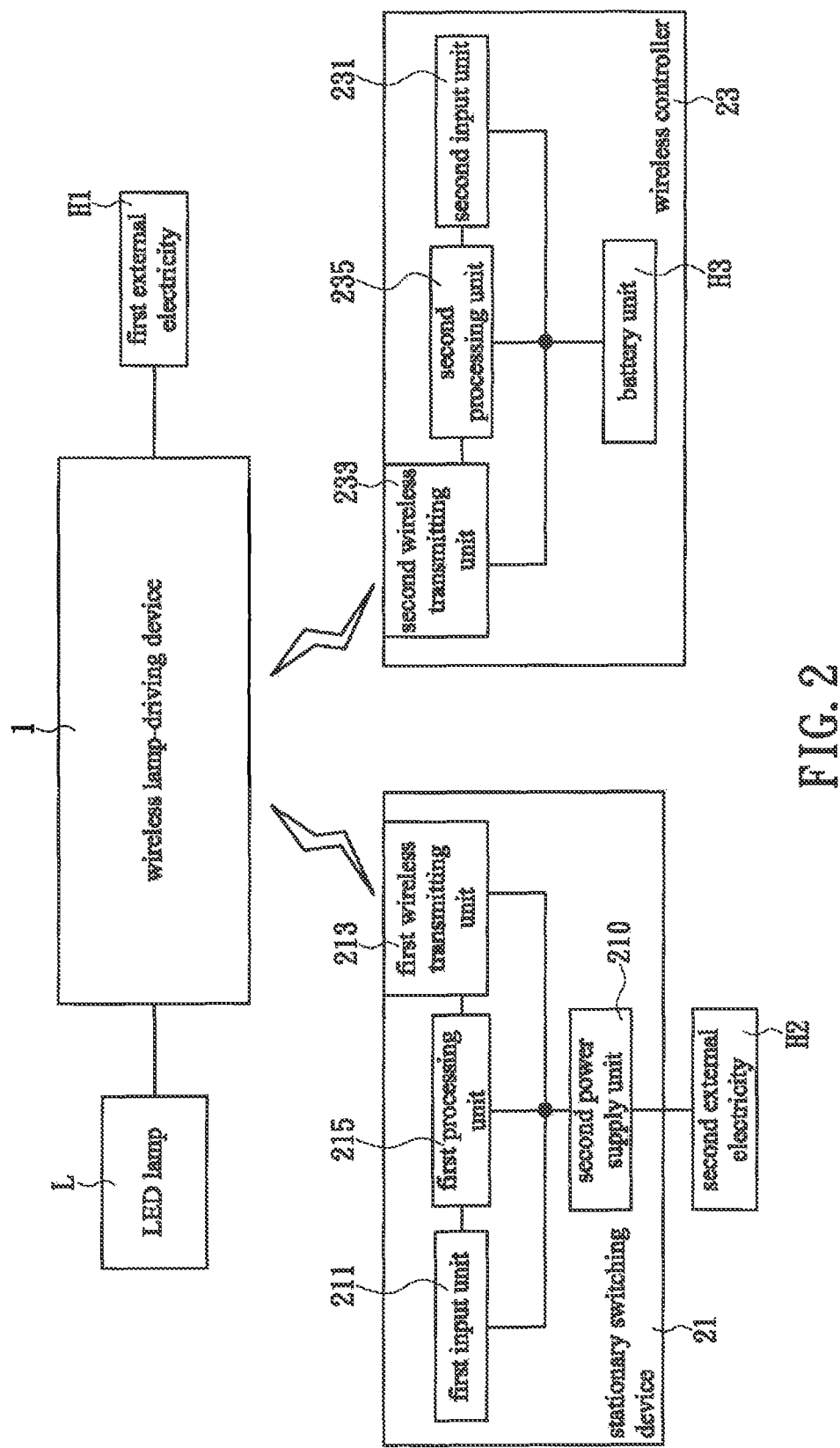
FIG. 2 is another hardware block diagram of the lamp system in FIG. 1, showing in particular the stationary switching device and the wireless controller.

The present invention relates to a wireless lamp-driving device with an independent power source and a lamp system including the same. Please note that the solution provided herein is intended specifically for a "conventional lamp system that includes both a 'stationary switching device' and a 'wireless controller'". Referring to FIG. 1 and FIG. 2, the lamp system according to an embodiment of the invention is composed of at least an LED lamp L, a wireless lamp-driving device 1, a stationary switching device 21, and a wireless controller 23. The wireless lamp-driving device 1 is configured to receive first external electricity H1 (e.g., mains electricity from a first power source) continuously and is electrically connected to the LED lamp L in order to transmit electricity to the LED lamp L. The wireless lamp-driving device 1 is coupled to the stationary switching device 21 and the wireless controller 23 separately by a wireless means. In this embodiment, the wireless lamp-driving device 1 and the stationary switching device 21 are coupled to each other by a "315/433 MHz/2.4 GHz radio frequency transmission technology", without limitation on direction. In other embodiments of the invention, however, a person skilled in the art may use other wireless technologies such as WiFi, Zigbee, and Bluetooth according to product requirements. Similarly, the wireless lamp-driving device 1 and the wireless controller 23 may be coupled to each other by any of the aforesaid wireless technologies.

It should be pointed out that, referring to FIG. 1 and FIG. 2, the "315/433 MHz/2.4 GHz radio frequency transmission technology" used in the present invention can provide more than a million codes for use by a large number of stationary switching devices 21 and wireless controllers 23, and due to the myriad of codes, cases where a code is assigned to two different lamp systems can be effectively avoided, lest a certain stationary switching device 21 (or wireless controller 23) control an unintended LED lamp L by accident. Besides, the "315/433 MHz/2.4 GHz radio frequency transmission technology" features an effective transmission distance of about 50 meters, so a user of the lamp system need not be particularly close to the wireless lamp-driving device 1 in order to control it. Rather, the user may stay relatively far from the wireless lamp-driving device 1 and use the wireless controller 23 to send wireless signals to the wireless lamp-driving device 1.

With continued reference to FIG. 1 and FIG. 2, the wireless lamp-driving device 1 includes a first power supply unit 11, a power switching portion 12, a wireless receiving unit 13, and a control unit 14. The first power supply unit 11 is configured to receive the first external electricity H1 (e.g., mains electricity from the first power source) continuously and to transform the properties of the first external electricity H1 (e.g., from alternating current to direct current) as needed by the wireless lamp-driving device 1 in order to provide thereto with the electricity required for its operation. In this embodiment, the first power supply unit 11 is separately and electrically connected to the power switching portion 12, the wireless receiving unit 13, and the control unit 14 in order to provide each of the above with the electricity required for its operation. The power switching portion 12 is electrically connected to the LED lamp L either directly or indirectly. When short-circuited, the power switching portion 12 enters a power supply mode, in which the power switching portion 12 transmits electricity to the LED lamp L in order for the LED lamp L to project light. When forming an open circuit, the power switching portion 12 enters a power-off mode instead, in which the power switching portion 12 does not transmit electricity to the LED lamp L and hence renders the LED lamp L unable to project light.

In this embodiment, referring again to FIG. 1 and FIG. 2, the control unit 14 is separately and electrically connected to the power switching portion 12 and the wireless receiving unit 13. The wireless receiving unit 13 is configured to receive wireless signals transmitted from the stationary switching device 21 and the wireless controller 23 and to relay the wireless signals to the control unit 14. After receiving and reading such a wireless signal, whose contents include "to turn on (or off) the lamp", the control unit 14 generates the corresponding control signal (which includes an instruction to turn on (or off) the lamp) according to the contents of the wireless signal. Then, the control unit 14 sends the control signal to the power switching portion 12 to switch the power switching portion 12 to the power supply mode (or the power-off mode), thereby changing the light emission state of the LED lamp L. The foregoing design allows the LED lamp L to be turned on and off with ease. More specifically, a user may operate the stationary switching device 21 (which is typically mounted on a wall) by, for example, pressing the on/off press-key on the stationary switching device 21, and the stationary switching device 21 will generate the corresponding wireless signal and send the wireless signal to the wireless lamp-driving device 1, in order for the wireless lamp-driving device 1 to adjust the light emission state of the LED lamp L according to the contents of the wireless signal. Alternatively, the user may operate the wireless controller 23, and the wireless controller 23 will also generate the corresponding wireless signal and send the wireless signal to the wireless lamp-driving device 1 to change the light emission state of the LED lamp L.

In this embodiment, with continued reference to FIG. 1 and FIG. 2, the stationary switching device 21 is fixed on an object (e.g., a wall or column) and at least includes a second power supply unit 210, a first input unit 211, a first processing unit 215, and a first wireless transmitting unit 213. The second power supply unit 210 is configured to receive second external electricity H2 (e.g., mains electricity from a power source different from that of the first external electricity H1) continuously and to transform the properties of the second external electricity H2 (e.g., from alternating current to direct current) as needed by the stationary switching device 21 in order to provide thereto with the electricity required for its operation. In this embodiment, the second power-supply unit 210 is separately and electrically connected to the first input unit 211, the first wireless transmitting unit 213, and the first processing unit 215 in order to provide each of the above with the electricity required for its operation.

As shown in FIG. 1 and FIG. 2, the first processing unit 215 is separately and electrically connected to the first input unit 211 and the first wireless transmitting unit 213. The first input unit 211 may be a touch panel, a (mechanical) press-key, a combination of press-keys (i.e., a plurality of press-keys), or a touch key (e.g., a capacitive touch key or one activated by blockage of light). When operated by a user, the first input unit 211 generates the corresponding input signal. For example, when the user presses the press-key of the first input unit 211 that is intended to turn on the lamp, the first input unit 211 generates an input signal with the contents "to turn on the lamp" and sends the input signal to the first processing unit 215. The first processing unit 215 generates a processing signal after receiving, and according to the contents of, the input signal, wherein the processing signal also includes the contents "to turn on the lamp". The first processing unit 215 sends the processing signal to the first wireless transmitting unit 213, which converts the processing signal into the corresponding wireless signal, and this wireless signal includes the contents "to turn on the lamp" too. The first wireless transmitting unit 213 sends the wireless signal to the wireless receiving unit 13 of the wireless lamp-driving device 1, in order for the wireless lamp-driving device 1 to act according to the contents of the wireless signal and drive the LED lamp L to project light.

In this embodiment, with continued reference to FIG. 1 and FIG. 2, the wireless controller 23 at least includes a battery unit H3, a second input unit 231, a second wireless transmitting unit 233, and a second processing unit 235. The battery unit H3 (e.g., a lithium battery, an alkaline battery, a solar cell, or a press-driven power generation module) is separately and electrically connected to the second input unit 231, the second wireless transmitting unit 233, and the second processing unit 235 in order to provide each of the above with the electricity required for its operation. The second processing unit 235 is separately and electrically connected to the second input unit 231 and the second wireless transmitting unit 233. The second input unit 231 may also be a touch panel, a press-key, a touch key, etc. When a user operates the second input unit 231 (e.g., by pressing the press-key of the second input unit 231 that is intended to turn off the lamp), the second input unit 231 generates the corresponding input signal (with the contents "to turn off the lamp") and sends the input signal to the second processing unit 235. The second processing unit 235 generates a processing signal after receiving, and according to the contents of, the input signal and sends the processing signal to the second wireless transmitting unit 233. The second wireless transmitting unit 233 converts the processing signal into the corresponding wireless signal and sends the wireless signal to the wireless receiving unit 13 of the wireless lamp-driving device 1, in order for the wireless lamp-driving device 1 to act according to the contents of the wireless signal and stop the LED lamp L from projecting light.

It can be known from the above that the lamp system of the present invention has the following effects in contrast to its prior art counterparts (i.e., lamp systems with a "wireless controller" as well as a "stationary switching device"):

(1) Referring to FIG. 1 and FIG. 2, now that the wireless lamp-driving device 1, the stationary switching device 21, and the wireless controller 23 have their respective power sources and the wireless lamp-driving device 1 is separately and wirelessly connected to the stationary switching device 21 and the wireless controller 23, switching the stationary switching device 21 to the "power-off mode (or lamp-turned-off mode)" only cuts off the stationary switching device 21 from the second external electricity H2; the wireless lamp-driving device 1 can receive the first external electricity H1 nevertheless, meaning the user can still control the wireless lamp-driving device 1 through the wireless controller 23 in order to adjust the light emission state of the LED lamp L. Thus, the lamp system of the invention provides greater convenience of use than its conventional counterparts.

(2) In cases where a user's working area is relatively far from the stationary switching device 21 and where the stationary switching device 21 is a touchscreen, whose power consumption is relatively high, the user may switch the stationary switching device 21 to the "power-off mode (or lamp-turned-off mode)" and use only the wireless controller 23 in order to save the electricity that would otherwise be consumed by the stationary switching device 21, thereby reducing electricity expenses.

(3) The wireless coupling between the wireless lamp-driving device 1 and the stationary switching device 21 spares the trouble of wiring. In contrast to the existing LED lamp systems, in which an LED lamp is invariably configured to draw electricity from the corresponding stationary switching device, the lamp system disclosed herein is effective in reducing the difficulty of interior electrical wiring.

(4) Since the wireless lamp-driving device 1 and the stationary switching device 21 (or the wireless controller 23) of the present invention are coupled by the "315/433 MHz/2.4 GHz radio frequency transmission technology", there is less directional limitation on the use of the stationary switching device 21 (or the wireless controller 23) than there is on the use of an existing wireless lamp system that is based on "infrared" transmission. This makes it easier to install the stationary switching device 21 and to operate the wireless controller 23 than their infrared-based equivalents would allow.

Apart from turning on and off the LED lamp L, the wireless lamp-driving device 1 of the present invention can be used to increase or decrease the brightness of the LED lamp L as needed. In the embodiment shown in FIG. 1 and FIG. 2, the wireless lamp-driving device 1 further includes a light adjustment module 17. The light adjustment module 17 is electrically connected to the control unit 14 and the LED lamp L, receives electricity from the first power supply unit 11 in order stay operative, and is configured to adjust the brightness of the LED lamp L according to light adjustment instructions from the control unit 14. The light adjustment module 17 may lie between the power switching portion 12 and the LED lamp L as in this embodiment or between the control unit 14 and the power switching portion 12 instead. In addition to adjusting the brightness of the LED lamp L, the light adjustment module 17 may, depending on the type of the LED lamp L, be configured to alter the color temperature of the LED lamp L (e.g., in cases where the LED lamp L has a plurality of components for emitting light of different color temperatures respectively) or make the LED lamp L flicker.

For example, referring back to FIG. 1 and FIG. 2, and assuming that the first input unit 211 is a combination of press-keys including one for effecting an increase in brightness, a user can increase the brightness of the LED lamp L by pressing and holding the brightness increasing press-key. While the user is doing so, the first processing unit 215 keeps receiving the input signal transmitted from the brightness increasing press-key. When the first processing unit 215 determines according to the input signal that the brightness increasing press-key has been pressed for longer than a first brightness increasing period (e.g., 3 seconds), a processing signal including a brightness increasing instruction is generated by the first processing unit 215 and sent to the first wireless transmitting unit 213. The first wireless transmitting unit 213 converts the processing signal into the corresponding wireless signal and sends the wireless signal to the wireless receiving unit 13, which receives the wireless signal and relays it to the control unit 14. Upon reading the brightness increasing instruction in the wireless signal, the control unit 14 generates a brightness increasing control signal and sends it to the light adjustment module 17 in order for the light adjustment module 17 to increase the brightness of the LED lamp L continuously.

With continued reference to FIG. 1 and FIG. 2, and assuming that the first input unit 211 further includes a press-key for effecting a decrease in brightness, a user can lower the brightness of the LED lamp L by pressing and holding the brightness decreasing press-key. While the user is doing so, the first processing unit 215 keeps receiving the input signal transmitted from the brightness decreasing press-key. When the first processing unit 215 determines according to the input signal that the brightness decreasing press-key has been pressed for longer than a first brightness decreasing period (e.g., 3 seconds), a processing signal including a brightness decreasing instruction is generated by the first processing unit 215 and sent to the first wireless transmitting unit 213. The first wireless transmitting unit 213 converts the processing signal into the corresponding wireless signal and sends the wireless signal to the wireless receiving unit 13, which receives the wireless signal and relays it to the control unit 14. Upon reading the brightness decreasing instruction in the wireless signal, the control unit 14 generates a brightness decreasing control signal and sends it to the light adjustment module 17 in order for the light adjustment module 17 to decrease the brightness of the LED lamp L continuously. It should be pointed out that the foregoing procedure for increasing the brightness of the LED lamp L and the procedure for decreasing the brightness of the LED lamp L can be applied to the wireless controller 23 just as well so that a user can raise and lower the brightness of the LED lamp L by operating the wireless controller 23.

Besides allowing a user to adjust the brightness of the LED lamp L as desired, the lamp system of the present invention may be configured to adjust the brightness of the LED lamp L automatically in accordance with the brightness of the surroundings. In the embodiment shown in FIG. 1 and FIG. 2, the wireless lamp-driving device 1 further includes a light sensing unit 19. The light sensing unit 19 is electrically connected to the control unit 14, receives electricity from the first power supply unit 11 in order to stay operative, and is configured to detect the intensity of ambient light, to generate a detection signal accordingly, and to send the detection signal to the control unit 14. The control unit 14 obtains the ambient light intensity from the contents of the detection signal and then generates the corresponding control signal. For example, the control unit 14 may refer to a lookup table with preplanned intensity levels in order to determine the level to which the ambient light intensity belongs, and then based on the level determined, a control signal including a brightness increasing or decreasing instruction is generated by the control unit 14 and sent to the light adjustment module 17 in order for the light adjustment module 17 to adjust the brightness of the LED lamp L.

While the invention herein disclosed has been described by means of specific embodiments, numerous modifications and variations could be made thereto by those skilled in the art without departing from the scope of the invention set forth in the claims.

What is claimed is:

1. A wireless lamp-driving device with an independent power source, wherein the wireless lamp-driving device is configured to receive external electricity and is electrically connected to a light-emitting diode (LED) lamp in order to control a light emission state of the LED lamp, the wireless lamp-driving device comprising:

a first power supply unit configured to receive the external electricity continuously and provide electricity required for operation of the wireless lamp-driving device;

a power switching portion separately and electrically connected to the first power supply unit and the LED lamp and configured to receive electricity transmitted from the first power supply unit, wherein the power switching portion enters a power supply mode when short-circuited, enters a power-off mode when forming an open circuit, provides electricity to the LED lamp when in the power supply mode, and stops providing electricity to the LED lamp when in the power-off mode;

a wireless receiving unit electrically connected to the first power supply unit and configured to receive a wireless signal transmitted from a stationary switching device or a wireless controller; and a control unit separately and electrically connected to the first power supply unit, the power switching portion, and the wireless receiving unit and configured to receive and read the wireless signal transmitted from the wireless receiving unit and adjust the power switching portion to the power supply mode or the power-off mode according to contents of the wireless signal, thereby changing the light emission state of the LED lamp.

2. The wireless lamp-driving device of claim 1, further comprising a light adjustment module, wherein the light adjustment module is electrically connected to the control unit and the LED lamp and is configured to receive electricity transmitted from the first power supply unit in order to stay operative, and after reading the wireless signal and determining that the wireless signal includes a brightness increasing instruction, the control unit sends a brightness increasing control signal to the light adjustment module in order for the light adjustment module to increase brightness of the LED lamp continuously.

3. The wireless lamp-driving device of claim 2, wherein after reading the wireless signal and determining that the wireless signal includes a brightness decreasing instruction, the control unit sends a brightness decreasing control signal to the light adjustment module in order for the light adjustment module to decrease the brightness of the LED lamp continuously.

4. The wireless lamp-driving device of claim 3, wherein the light adjustment module lies between the control unit and the power switching portion and is electrically connectable to the LED lamp through the power switching portion.

5. The wireless lamp-driving device of claim 4, further comprising a light sensing unit, wherein the light sensing unit is electrically connected to the control unit and is configured to receive electricity transmitted from the first power supply unit in order to stay operative, and the light sensing unit is configured to detect intensity of ambient light, generate a detection signal accordingly, and send the detection signal to the control unit in order for the control unit to send to the light adjustment module a control signal corresponding to contents of the detection signal, and for the light adjustment module to adjust the light emission state of the LED lamp according to the control signal.

6. The wireless lamp-driving device of claim 3, wherein the light adjustment module lies between the power switching portion and the LED lamp and is electrically connectable to the control unit through the power switching portion.

7. The wireless lamp-driving device of claim 6, further comprising a light sensing unit, wherein the light sensing unit is electrically connected to the control unit and is configured to receive electricity transmitted from the first power supply unit in order to stay operative, and the light sensing unit is configured to detect intensity of ambient light, generate a detection signal accordingly, and send the detection signal to the control unit in order for the control unit to send to the light adjustment module a control signal corresponding to contents of the detection signal, and for the light adjustment module to adjust the light emission state of the LED lamp according to the control signal.

8. A lamp system including a wireless lamp-driving device with an independent power source, wherein the lamp system is composed at least of a light-emitting diode (LED) lamp, a stationary switching device, and a wireless controller, in addition to the wireless lamp-driving device, and the wireless lamp-driving device is electrically connected to the LED lamp, is connected to the stationary switching device and the wireless controller separately in a wireless manner, and is configured to receive a wireless signal transmitted from the stationary switching device and a wireless signal transmitted from the wireless controller and control a light emission state of the LED lamp according to contents of each said wireless signal, the lamp system being characterized in that:

each of the wireless lamp-driving device, the stationary switching device, and the wireless controller has an independent power source, the wireless lamp-driving device is configured to receive first external electricity continuously and transmit, or stopping transmitting, electricity to the LED lamp in order to control the light emission state of the LED lamp, the stationary switching device is configured to receive second external electricity continuously, and the wireless controller is configured to receive electricity from a battery unit provided therein.

9. The lamp system of claim 8, wherein the wireless lamp-driving device comprises:

a first power supply unit configured to receive the first external electricity continuously and provide electricity required for operation of the wireless lamp-driving device;

a power switching portion separately and electrically connected to the first power supply unit and the LED lamp and configured to receive electricity transmitted from the first power supply unit, wherein the power switching portion enters a power supply mode when short-circuited, enters a power-off mode when forming an open circuit, provides electricity to the LED lamp when in the power supply mode, and stops providing electricity to the LED lamp when in the power-off mode;

a wireless receiving unit electrically connected to the first power supply unit and configured to receive the wireless signal transmitted from each of the stationary switching device and the wireless controller, and a control unit separately and electrically connected to the first power supply unit, the power switching portion, and the wireless receiving unit and configured to receive and read each said wireless signal transmitted from the wireless receiving unit and adjust the power switching portion to the power supply mode or the power-off mode according to contents of each said wireless signal received, thereby changing the light emission state of the LED lamp.

10. The lamp system of claim 9, wherein the wireless lamp-driving device further comprises a light adjustment module, the light adjustment module is electrically connected to the control unit and the LED lamp and is configured to receive electricity transmitted from the first power supply unit in order to stay operative, and after reading a said wireless signal and determining that the wireless signal includes a brightness increasing instruction, the control unit sends a brightness increasing control signal to the light adjustment module in order for the light adjustment module to increase brightness of the LED lamp continuously.

11. The lamp system of claim 10, wherein after reading a said wireless signal and determining that the wireless signal includes a brightness decreasing instruction, the control unit sends a brightness decreasing control signal to the light adjustment module in order for the light adjustment module to decrease the brightness of the LED lamp continuously.

12. The lamp system of claim 11, further comprising a light sensing unit, wherein the light sensing unit is electrically connected to the control unit and is configured to receive electricity transmitted from the first power supply unit in order to stay operative, and the light sensing unit is configured to detect intensity of ambient light, generate a detection signal accordingly, and send the detection signal to the control unit in order for the control unit to send to the light adjustment module a control signal corresponding to contents of the detection signal, and for the light adjustment module to adjust the light emission state of the LED lamp according to the control signal.

13. The lamp system of claim 12, wherein the stationary switching device comprises:
   a second power supply unit configured to receive the second external electricity continuously and provide electricity required for operation of the stationary switching device;
   a first input unit electrically connected to the second power supply unit, wherein the first input unit, when operated, generates a corresponding input signal;
   a first processing unit separately and electrically connected to the second power supply unit and the first input unit and configured to receive the input signal transmitted from the first input unit and generate a processing signal corresponding to the input signal; and
   a first wireless transmitting unit separately and electrically connected to the second power supply unit and the first processing unit and configured to receive the processing signal transmitted from the first processing unit, convert the processing signal into a corresponding wireless signal, and send this wireless signal to the wireless receiving unit of the wireless lamp-driving device.

14. The lamp system of claim 13, wherein the wireless controller comprises:
   the battery unit for providing electricity required for operation of the wireless controller,
   a second input unit electrically connected to the battery unit, wherein the second input unit, when operated, generates a corresponding second input signal;
   a second processing unit separately and electrically connected to the battery unit and the second input unit and configured to receive the second input signal transmitted from the second input unit and generate a second processing signal corresponding to the second input signal; and
   a second wireless transmitting unit separately and electrically connected to the battery unit and the second processing unit and configured to receive the second processing signal transmitted from the second processing unit, convert the second processing signal into a corresponding wireless signal, and send this wireless signal to the wireless receiving unit of the wireless lamp-driving device.

15. The lamp system of claim 14, wherein the first input unit comprises a brightness increasing press-key, the first processing unit generates a processing signal including the brightness increasing instruction upon determining that the brightness increasing press-key has been pressed for longer than a first brightness increasing period, the processing signal including the brightness increasing instruction is sent by the first processing unit to the first wireless transmitting unit and is converted by the first wireless transmitting unit into a corresponding wireless signal, and the first wireless transmitting unit sends this wireless signal to the wireless receiving unit of the wireless lamp-driving device in order for the control unit to generate the brightness increasing control signal according to contents of this wireless signal and send the brightness increasing control signal to the light adjustment module, thereby instructing the light adjustment module to increase the brightness of the LED lamp continuously.

16. The lamp system of claim 15, wherein the first input unit further comprises a brightness decreasing press-key, the first processing unit generates a processing signal including the brightness decreasing instruction upon determining that the brightness decreasing press-key has been pressed for longer than a first brightness decreasing period, the processing signal including the brightness decreasing instruction is sent by the first processing unit to the first wireless transmitting unit and is converted by the first wireless transmitting unit into a corresponding wireless signal, and the first wireless transmitting unit sends this wireless signal to the wireless receiving unit of the wireless lamp-driving device in order for the control unit to generate the brightness decreasing control signal according to contents of this wireless signal and send the brightness decreasing control signal to the light adjustment module, thereby instructing the light adjustment module to decrease the brightness of the LED lamp continuously.

17. The lamp system of claim 16, wherein the second input unit comprises a second brightness increasing press-key, the second processing unit generates a processing signal including the brightness increasing instruction upon determining that the second brightness increasing press-key has been pressed for longer than the first brightness increasing period, the processing signal generated by the second processing unit and including the brightness increasing instruction is sent by the second processing unit to the second wireless transmitting unit and is converted by the second wireless transmitting unit into a corresponding wireless signal, and the second wireless transmitting unit sends this wireless signal to the wireless receiving unit of the wireless lamp-driving device in order for the control unit to generate the brightness increasing control signal according to contents of this wireless signal and send the brightness increasing control signal to the light adjustment module, thereby instructing the light adjustment module to increase the brightness of the LED lamp continuously.

18. The lamp system of claim 17, wherein the second input unit further comprises a second brightness decreasing press-key, the second processing unit generates a processing signal including the brightness decreasing instruction upon determining that the second brightness decreasing press-key has been pressed for longer than the first brightness decreasing period, the second processing signal generated by the second processing unit and including the brightness decreasing instruction is sent by the second processing unit to the second wireless transmitting unit and is converted by the second wireless transmitting unit into a corresponding wireless signal, and the second wireless transmitting unit sends this wireless signal to the wireless receiving unit of the wireless lamp-driving device in order for the control unit to generate the brightness decreasing control signal according to contents of this wireless signal and send the brightness decreasing control signal to the light adjustment module, thereby instructing the light adjustment module to decrease the brightness of the LED lamp continuously.

\* \* \* \* \*